US008195487B2

(12) United States Patent
Collomb et al.

(10) Patent No.: US 8,195,487 B2
(45) Date of Patent: Jun. 5, 2012

(54) COMPUTER NETWORKS

(75) Inventors: Jean-Michel Collomb, Sophia-Antipolis (FR); Jean-marc Bronoel, Sophia-Antipolis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1266 days.

(21) Appl. No.: 11/872,861

(22) Filed: Oct. 16, 2007

(65) Prior Publication Data

US 2008/0208653 A1 Aug. 28, 2008

(30) Foreign Application Priority Data

Oct. 26, 2006 (EP) ..................................... 06301091

(51) Int. Cl.
*G06Q 10/00* (2012.01)

(52) U.S. Cl. ..................................... 705/7.11; 705/7.27

(58) Field of Classification Search ................. 705/7.11, 705/7.27
See application file for complete search history.

(56) References Cited

U.S. PATENT DOCUMENTS

| | | | | |
|---|---|---|---|---|
| 6,556,659 B1 * | 4/2003 | Bowman-Amuah | ......... | 379/9.04 |
| 6,701,342 B1 * | 3/2004 | Bartz et al. | ..................... | 709/200 |
| 6,952,680 B1 * | 10/2005 | Melby et al. | .................... | 705/28 |
| 2004/0193938 A1 * | 9/2004 | Shah et al. | ......................... | 714/2 |
| 2005/0064821 A1 * | 3/2005 | Hedberg et al. | ............. | 455/67.11 |
| 2006/0153090 A1 * | 7/2006 | Bishop et al. | .................. | 370/252 |
| 2006/0245369 A1 * | 11/2006 | Schimmelpfeng et al. | ... | 370/252 |
| 2007/0083513 A1 * | 4/2007 | Cohen et al. | ....................... | 707/6 |
| 2007/0083650 A1 * | 4/2007 | Collomb et al. | ............... | 709/224 |
| 2007/0130306 A1 * | 6/2007 | Ofel | .............................. | 709/223 |
| 2008/0208653 A1 * | 8/2008 | Collomb et al. | ................... | 705/7 |
| 2009/0116495 A1 * | 5/2009 | Lejkin et al. | ............. | 370/395.21 |
| 2009/0122706 A1 * | 5/2009 | Alfano et al. | .................. | 370/237 |
| 2010/0257007 A1 * | 10/2010 | Chan et al. | ......................... | 705/7 |

* cited by examiner

*Primary Examiner* — William Rankins

(57) ABSTRACT

According to one embodiment of the present invention, there is provided a method of analyzing a computer infrastructure providing a service, an intended quality level of the service being defined by at least one service level objective defining a service level quality objective and a related compliance level, the computer infrastructure comprising a plurality of components, the method comprising: obtaining first service level objective compliance data for a selected service level objective, the compliance data being calculated using data collected from the computer infrastructure; calculating second service level objective compliance data for the selected service level objective using in part the collected data and for a selected service level quality objective a value that meets that objective; calculating a difference between the first and second data; and identifying, based on the calculated difference, one or more components suitable for modification.

13 Claims, 3 Drawing Sheets

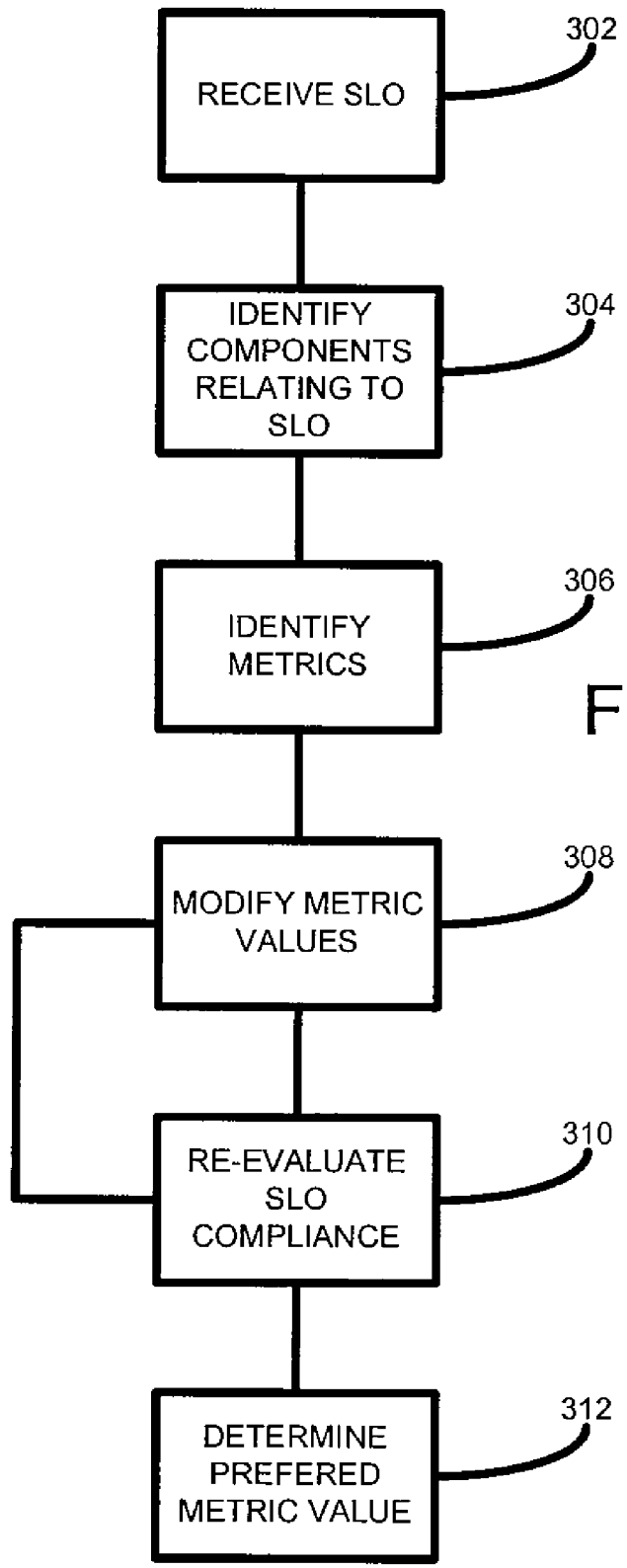

COMPUTER NETWORKS

FIELD OF THE INVENTION

The present invention relates generally to the field of computing.

BACKGROUND OF THE INVENTION

Computer systems are frequently used in enterprise environments to provide services to customers. Example services include providing telecommunication networks, Internet-based shopping services, storage services, and so on.

Whatever the service concerned service providers are generally under an obligation to ensure that an agreed quality of service is provided to their customers over the period for which the service is to be provided.

Service level agreements (SLA) are generally used between service providers and their customers to define an agreed quality of service for a particular service over a predetermined period of time, referred to hereinafter as the evaluation period. An SLA typically defines multiple service level objectives (SLO) that must be met in order for the SLA to be considered complied with. An SLO typically defines an SLO quality objective, such as maximum acceptable server response time, a maximum acceptable transaction processing time, a minimum acceptable network bandwidth, etc. An SLO may also have a required SLO compliance level (often shortened to simply SLO compliance) which indicates the percentage of the evaluation period that the SLO quality objective must be met. So, an SLO may define, for example, that a maximum acceptable server response time is 10 ms (SLO quality objective) and that this must be complied with for 97% of the evaluation period (SLO compliance level).

SLOs may be hierarchically arranged, for example an SLO compliance level defining that a server must be available for at least 98% of the evaluation period may be dependent on an SLO quality objective defining the minimum amount of free memory, the maximum CPU load, etc.

To determine whether an SLA has been complied with at the end of an evaluation period it is necessary to monitor relevant components or configuration items (CI) of the IT infrastructure, as defined by the various SLOs, and to periodically record performance data during the evaluation period. Solutions, such as the Hewlett-Packard's Service Level Manager product, part of the Hewlett-Packard OpenView suite of applications, enable performance data to be collected from components of an IT infrastructure.

The recorded performance data can then be analysed to determine, at the end of the evaluation period, whether the SLA was complied with.

Since SLAs generally impose contractual obligations on a service provider, failure to comply with an SLA can lead to contractual penalties being imposed. However, whilst meeting SLA requirements is important to service providers, the cost of providing the service is also important.

For example, whilst it is possible for service providers to over specify components in an IT infrastructure to help ensure that an SLA is complied with, over specifying components typically comes at a price. Furthermore, over specifying components may lead to unnecessary redundancy. On the other hand, under specifying components may typically result in lower initial cost but may also put SLA compliance at risk and hence increase the risk of incurring penalties.

Due to the general complexity of IT infrastructures and the often complex interdependencies of IT infrastructure components as well as the way that an SLA may be dependent of multiple hierarchical SLOs, and each SLO may in turn be dependent on multiple configuration items, it is inherently difficult to accurately determine where improvements in or modifications to the IT infrastructure can be made.

Accordingly, one aim of the present invention is to overcome, or at least alleviate, at least some of the above-mentioned problems.

SUMMARY OF THE INVENTION

According to a first aspect of the present invention, there is provided a method of analysing a computer infrastructure providing a service, an intended quality level of the service being defined by at least one service level objective defining a service level quality objective and a related compliance level, the computer infrastructure comprising a plurality of components. The method comprises obtaining first service level objective compliance data for a selected service level objective, the compliance data being calculated using data collected from the computer infrastructure, calculating second service level objective compliance data for the selected service level objective using in part the collected data and for a selected service level quality objective a value that meets that objective, calculating a difference between the first and second data, and identifying, based on the calculated difference, one or more components suitable for modification.

According to a second aspect of the present invention, there is provided an apparatus for analysing a computer infrastructure providing a service, an intended quality level of the service being defined by at least one service level objective defining a service level quality objective and a related compliance level, the computer infrastructure comprising a plurality of components. The apparatus comprises means for obtaining first service level objective compliance data for a selected service level objective, the compliance data being calculated using data collected from the computer infrastructure, processing logic for calculating second service level objective compliance data for the selected service level objective using in part the collected data and for a selected service level quality objective a value that meets that objective, a difference calculation module for calculating a difference between the first and second data, and an analysis module for identifying, based on the calculated difference, one or more components suitable for modification.

BRIEF DESCRIPTION OF THE DRAWINGS

Embodiments of the invention will now be described, by way of non-limiting example only, with reference to the accompanying diagrams, in which:

FIG. 3 is a flow diagram outlining example processing steps that may be taken by the scenario analyser shown in FIG. 1.

DETAILED DESCRIPTION OF THE PREFERRED EMBODIMENTS

Figure 1:
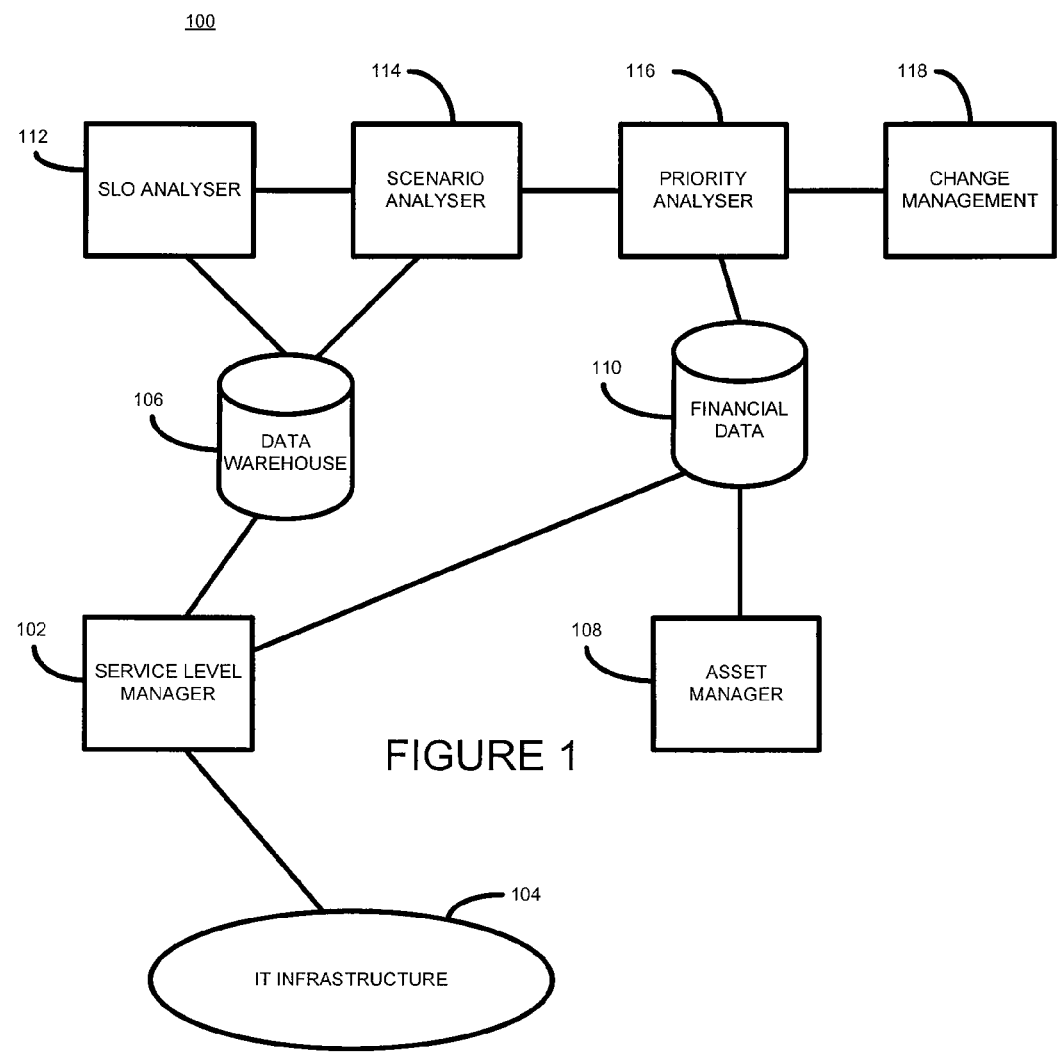
FIG. 1 is a block diagram of a system according to one embodiment of the present invention.

Referring now to FIG. 1, there is shown a block diagram of a system 100 according to an embodiment of the present invention.

A service level manager 102 is provided to monitor configuration items (CI) or components of an IT infrastructure 104 in a generally known manner. For completeness a brief outline of operation of the service level manager 102 is now given. The IT infrastructure 104 comprises an arrangement of IT components (not shown) for providing a service to a customer (not shown). The service level manager 102 models the IT infrastructure 104, for example, using a configuration item (CI) hierarchy. The model for the IT infrastructure 104 may be, for example, obtained from a configuration management database (CMDB) (not shown) or in any other appropriate manner.

A configuration item, as is well known in the art, refers to any item or unit that can be individually managed, such as computer hardware such as computer servers, computing devices, networks, switches, routers, etc.

For each configuration item one or more measurable metrics may be defined. The defined metrics are suitably chosen to enable an availability status for each CI to be determined. For example, a CI may be a computer server, and related metrics may be CPU load, free disk space, available memory, number of lost packets, and so on.

The model may also include one or more rules to define the propagation of component statuses within the hierarchical model. For example, the availability status of a computer server may be made dependent on the availability of a network storage array.

The service level manager 102 also has access to details of one or more SLAs applicable to a service being provided through the IT infrastructure 104.

As previously mentioned, an SLA defines an agreed level of service. For example, if the service provided by the IT infrastructure 104 is an email service a number of service levels may be defined, each service level being defined by an SLA. For instance, for high end customers a 'gold' level SLA may be defined and a 'silver' level SLA may be defined for lower end users.

The 'gold' level SLA may, for example, define SLOs that require server response times to be less than 1 second for at least 99% of the evaluation period, and that the amount of free disk space be greater than 10 GB for 98% of the evaluation period. A 'silver' level SLA may define less rigorous requirements.

As the IT infrastructure 104 operates to provide the appropriate service the service level manager 102 measures the defined metrics for each defined CI and records their values in a data warehouse 106.

A real-time or near real-time CI availability status, based on the defined metrics and propagation rules, may be calculated by the service level manager 102 and the results also stored in the data warehouse 106.

Figure 2:
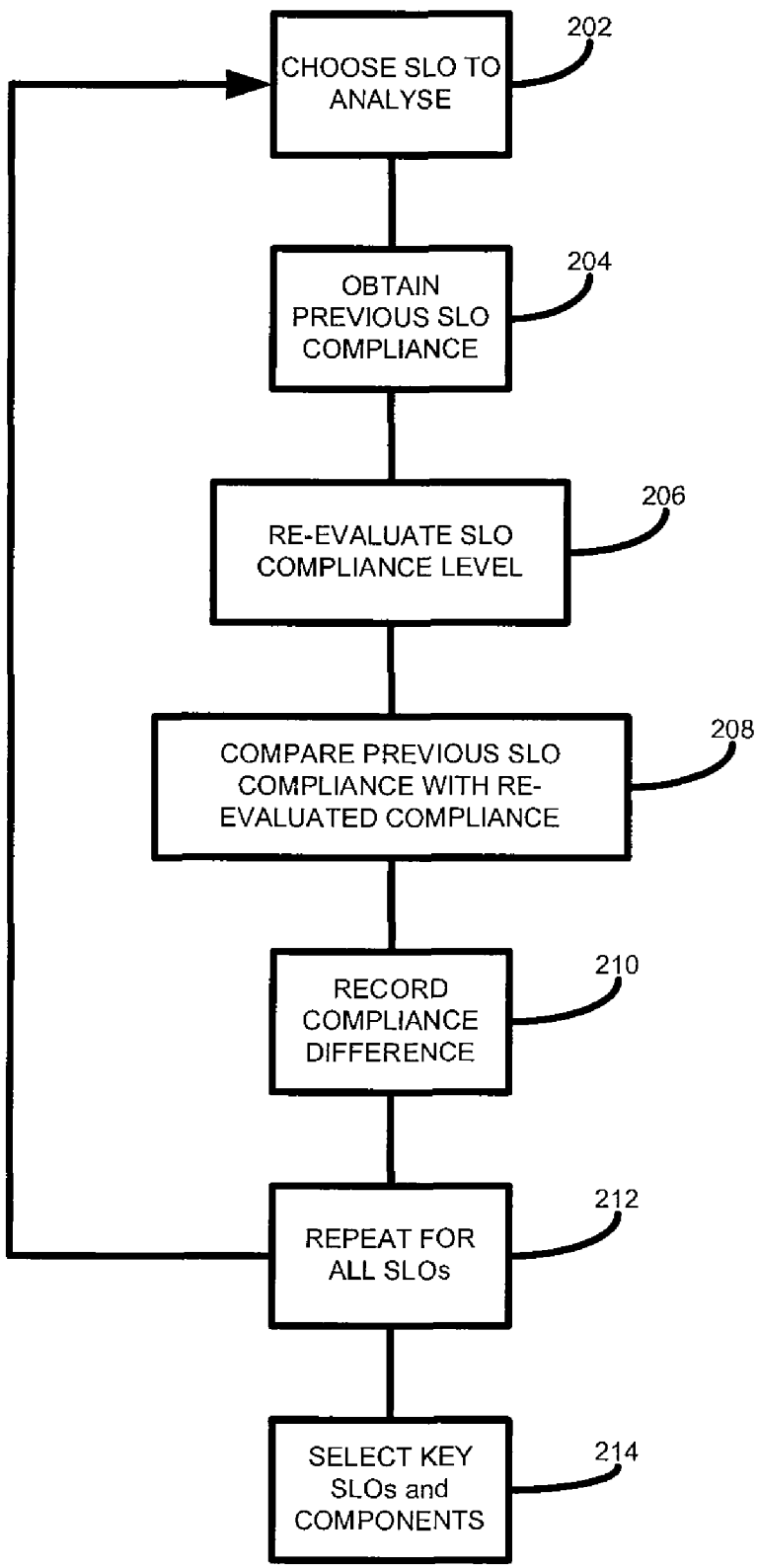
FIG. 2 is a flow diagram outlining example processing steps that may be taken by the service level agreement analyser shown in FIG. 1.

An embodiment of the present invention will now be described with further reference to FIG. 2 which is a flow diagram outlining example processing steps that may be taken by an SLO analyser 112.

The SLO analyser 112 selects, for example from the data warehouse 106, an SLA to be analysed. The selected SLA relates to a service provided by the IT infrastructure 104. The SLA may be provided in a suitable computer readable format, such as an XML format. Those skilled in the art will appreciate that some services may be covered by more than one SLA and the techniques described below apply equally to multiple SLAs. However, for clarity of explanation the following description only describes a single SLA.

At step 202 an SLO compliance level defined in the selected SLA is chosen. A historical evaluation period, such as the last completed SLA evaluation period, is chosen and the SLO compliance level for that period is either obtained (step 204), if previously determined and stored in the data warehouse 106, or otherwise is calculated using the stored historical metric data stored in the data warehouse 106.

At step 206 the SLO analyser 112 re-evaluates the calculated SLO compliance level using the historical metric data, obtained from the data warehouse 106, for the chosen historical evaluation period. However, the re-evaluation is performed by modifying the values of one or more of the SLO quality objectives on which the SLO compliance level depends to a value that meets that objective. For example, if an SLO defines that a server response times is to be less than 1 second for at least 99% of the evaluation period, and that the amount of free disk space be greater than 10 GB for 98% of the evaluation period, then the SLO quality objective values are modified, for the purposes of the recalculation, such that the server response time is, for example, 0.999 s and the amount of free disk space is 10.001 GB.

The re-calculated SLO compliance level is then compared (step 208) with the historical SLO compliance level and the difference between the compliance levels is recorded (step 210) in a suitable memory or storage media.

The above steps 202 to 212 are repeated for each SLO having a defined compliance level in the SLA under evaluation.

Once all of the SLO compliance levels have been re-evaluated, at step 214, key SLOs are identified from within the SLA under evaluation.

Key SLOs may be identified in a number of different ways. For example, where the difference between a measured SLO compliance level and a recalculated SLO compliance level is very small or between first predefined limits, this implies that at least some of the SLO quality objectives on which the SLO compliance level depends have little impact on the helping the SLO compliance level being met. This may, for instance, be used to further imply that the configuration items related to that SLO quality objective may be 'over specified'.

Take, for example, an SLO that defines that the minimum free memory of a computer server must be greater than 10 MB for greater than 95% of the evaluation period. If the measured SLO compliance level was 99% and the recalculated SLO compliance was 100% this may show, for example, that the amount of physical memory used in the server may be more than that actually required during operation of the service. The corresponding configuration item (i.e. the physical computer memory of the computer server) may thus be highlighted for possible downgrading.

If the difference between a measured SLO compliance level and a recalculated SLO compliance level is higher, or between second predefined limits, this implies that at least some of the SLO quality objectives on which the SLO compliance level depends have a significant impact on the helping the SLO compliance level being met. This may, for instance, be used to further imply that the configuration items related to those SLO objectives may be 'under specified'. Taking again the example of an SLO defines that minimum free memory of a computer server must be greater than 10 MB for greater than 95% of the evaluation period. If the measured SLO compliance level was 90% and the recalculated SLO compliance was 100% this may show, for example, that the amount of physical memory used in the server may be less than that actually required during operation of the service. The corresponding configuration item (i.e. the physical computer memory of the computer server) may thus be highlighted for possible upgrading. The first and second predefined limits may be chosen in any suitable manner, depending on particular requirements. For example, the first predefined limits may be chosen to be between 0 and 1% and second predefined limits between 1% and 100%.

Once one or more key SLOs have been selected using the above-described techniques a second stage may be performed in order to determine an amount by which different configuration items may be modified. This stage is performed by a scenario analyser 114, which is described in further detail with reference to FIG. 3.

At step 302 the scenario analyser 114 receives from the SLO analyser 112 details of one or more key SLOs selected as described above. For the purposes of explanation an SLO defining that minimum free memory of a computer server must be greater than 10 MB for greater than 95% of the evaluation period is received. The received SLO is analysed to determine the configuration items to which it relates (step 304) and also the metrics concerned (step 306). In the present example the configuration item identified is the physical memory of a computer server and the identified metric is the amount of free memory available.

The chosen metric value of the configuration item is then changed in a suitable manner. For example if the current physical memory size is 1 GB, a physical memory size of 512 MB may be used and the SLO compliance percentage is re-evaluated. Multiple changes to the metric value may be made over a range of values and the SLO compliance value may be recalculated each time.

In this way the effect of increasing or decreasing the amount of a physical memory on the overall SLO compliance percentage can be accurately determined. From the results of the multiple re-evaluations a preferred memory size for the server can be determined ensuring that neither an unnecessarily high or low bandwidth is chosen.

The above-steps may be repeated for each key SLO identified by the SLO analyser 112 as described above.

When each of the key SLOs have been analysed, the preferred values for each of them, along with their preferred metric values may be sent to a priority analyser 116. The priority analyser 116 uses financial data stored in a financial data store 110 to determine whether the proposed changes in metric values are worthwhile from a financial perspective. The financial data store holds, for example, information relating to any financial penalties as well as, for example, cost information relating to making modifications to different IT infrastructure components. Such cost information may include, for example, the cost of any specific hardware components, estimated installation costs, maintenance costs etc. An asset manager, 108, may be used to provide at least some of the financial data in the data store 110.

The priority analyser 116 determines, using the financial data, whether the modification to the identified configuration item is financially beneficial, taking into account the cost of modifying the configuration item as suggested and the cost of paying any penalties imposed by the SLA for the service. In this way, all of the suggested configuration item modifications are analysed and details of a sub-set of those suggestions are forwarded to a change management system 118.

The change management system 118 may, for instance, be arranged to automatically apply modifications where possible. For instance, in some circumstances a modification may be applied by a suitable software upgrade or through the acquisition of an additional resource license. This could be the case, for example, where a pool of processors is available on demand. Alternatively, the change management system 118 can alert a human operator to the suggested changes in order for appropriate hardware upgrades or downgrades to be effected.

In a further embodiment the change management system 118 is used to reconfigure the IT infrastructure 104 to enable, for example, underused configuration items to be used to reduce the load on overused configuration items. For example, a database stored on an overused storage medium may be moved to a storage medium having a large amount of free space. The change management system, in this case, may have to update or move network identifiers or links to the moved database as appropriate.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as described above and a machine readable storage storing such a program. Still further, embodiments of the present invention may be conveyed electronically via any medium such as a communication signal carried over a wired or wireless connection and embodiments suitably encompass the same.

The invention claimed is:

1. A method of analysing a computer infrastructure providing a service, an intended quality level of the service being defined by at least one service level objective defining a service level quality objective and a related compliance level, the computer infrastructure comprising a plurality of components, the method comprising:
    using a processor-based system to obtain first service level objective compliance data for a selected service level objective, the compliance data being calculated using data collected from the computer infrastructure;
    using the processor-based system to calculate second service level objective compliance data for the selected service level objective using in part the collected data and for a selected service level quality objective a value that meets that objective;
    calculating a difference between the first and second data; and
    identifying, based on the calculated difference, one or more components suitable for modification.

2. The method of claim 1, further comprising, where the quality level of the service is defined by a plurality of service level objectives, repeating using the processor-based system to calculate second service level objective data for each service level quality objective of each service level objective.

3. The method of claim 1, wherein the step of identifying further comprises, where the calculated difference is within first predetermined limits identifying a component for modification in a first manner, and where the calculated difference is within second predetermined limits identifying a component for modification in a second manner.

4. The method of claim 3, wherein the step of identifying one or more suitable components comprises prioritising a predetermined number of components suitable for modification, the step of prioritising further comprising accessing financial data relating to the proposed modification.

5. The method of claim 3, further comprising, modifying at least one of the identified components in accordance with the identified manner.

6. The method of claim 5, further comprising upgrading components identified to be modified in a first manner and downgrading components identified to be modified by a second manner.

7. The method of claim 3, further comprising forwarding an indication of the components identified for modification to a change management system for the modifications to be performed.

8. The method of claim 1, wherein the collected data is collected from the computer infrastructure during operation of the service over a predetermined period.

9. An article comprising a non-transitory machine readable storage to store instructions that when executed by a processor-based system cause the processor-based system to:
   obtain first service level objective compliance data for a selected service level objective for a computer infrastructure comprising a plurality of components, the compliance data being calculated using data collected from the computer infrastructure;
   calculate second service level objective compliance data for the selected service level objective using in part the collected data and for a selected service level quality objective a value that meets that objective;
   calculate a difference between the first and second data; and
   identify, based on the calculated difference, one or more components suitable for modification.

10. The article of claim 9, wherein the quality level of the service is defined by a plurality of service level objectives, the storage medium storing instructions that when executed by the processor-based system cause the processor-based system to recalculate the second service level objective data for each service level quality objective of each service level objective.

11. The article of claim 9, wherein the collected data is collected from the computer infrastructure during operation of the service over a predetermined period.

12. A system comprising:
   a service level objective analyser comprising a processor adapted to:
   obtain first service level objective compliance data for a selected service level objective for a computer infrastructure comprising a plurality of components, the compliance data being calculated using data collected from the computer infrastructure;
   calculate second service level objective compliance data for the selected service level objective using in part the collected data and for a selected service level quality objective a value that meets that objective;
   calculate a difference between the first and second data;
   identify, based on the calculated difference, one or more components suitable for modification; and
   a scenario analyser comprising a processor adapted to determine how to change the computer infrastructure based on the identified one or more components.

13. The system of claim 12, wherein the collected data is collected from the computer infrastructure during operation of the service over a predetermined period.

* * * * *